US007032075B2

(12) United States Patent
Katayama

(10) Patent No.: US 7,032,075 B2
(45) Date of Patent: Apr. 18, 2006

(54) INSTRUCTION CACHE AND MICROPROCESSOR

(75) Inventor: Isao Katayama, Chigasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 423 days.

(21) Appl. No.: 10/372,319

(22) Filed: Feb. 25, 2003

(65) Prior Publication Data

US 2004/0044848 A1 Mar. 4, 2004

(30) Foreign Application Priority Data

Sep. 3, 2002 (JP) ............................ 2002-257971

(51) Int. Cl.
*G06F 12/00* (2006.01)

(52) U.S. Cl. ...................... 711/125; 711/133; 711/134; 711/154; 711/163; 713/320

(58) Field of Classification Search ................ 711/125, 711/133, 134, 154, 163; 713/320
See application file for complete search history.

(56) References Cited

U.S. PATENT DOCUMENTS 5,440,707 A * 8/1995 Hayes et al. .................. 711/3
5,752,045 A * 5/1998 Chen .......................... 713/322
5,835,934 A * 11/1998 Tran ............................. 711/3
5,845,309 A * 12/1998 Shirotori et al. ............... 711/3
5,911,058 A * 6/1999 Ogawa ....................... 712/219
6,345,336 B1 2/2002 Takahashi ................... 711/125
6,535,959 B1 * 3/2003 Ramprasad et al. ........ 711/125

FOREIGN PATENT DOCUMENTS

JP 9-204359 8/1997
JP 2000-200217 7/2000
JP 2002-63073 A 2/2002

OTHER PUBLICATIONS

Inoue et al., "A History-Based I-Cache for Low-Energy Multimedia Applications," pp 148-153, IEEE, Aug. 12, 2002.*

* cited by examiner

*Primary Examiner*—Stephen C. Elmore
(74) *Attorney, Agent, or Firm*—Oblon, Spivak, McClelland, Maier & Neustadt, P.C.

(57) ABSTRACT

In a central processing unit, caching is carried out for an instruction cache tag memory, so that, without making modifications to a conventional instruction cache controller, the number of times of access to the instruction cache tag memory, which consumes a large amount of electric power, is reduced, and low electric power consumption is attained.

10 Claims, 8 Drawing Sheets

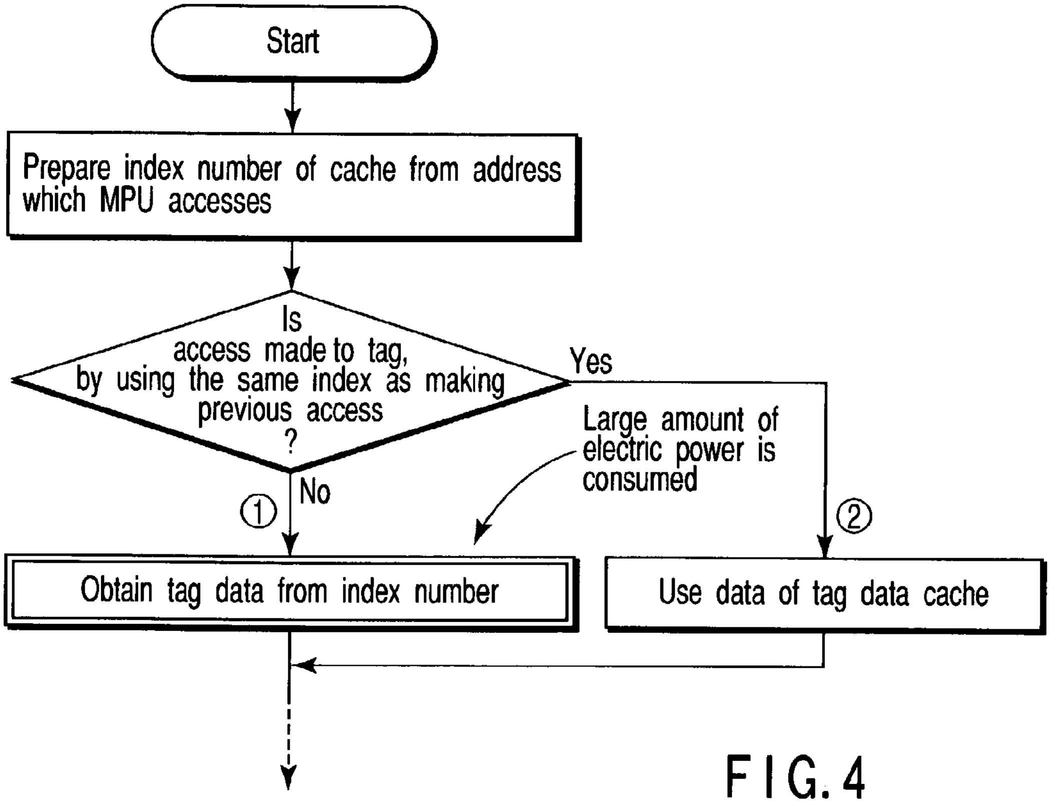
F I G. 4
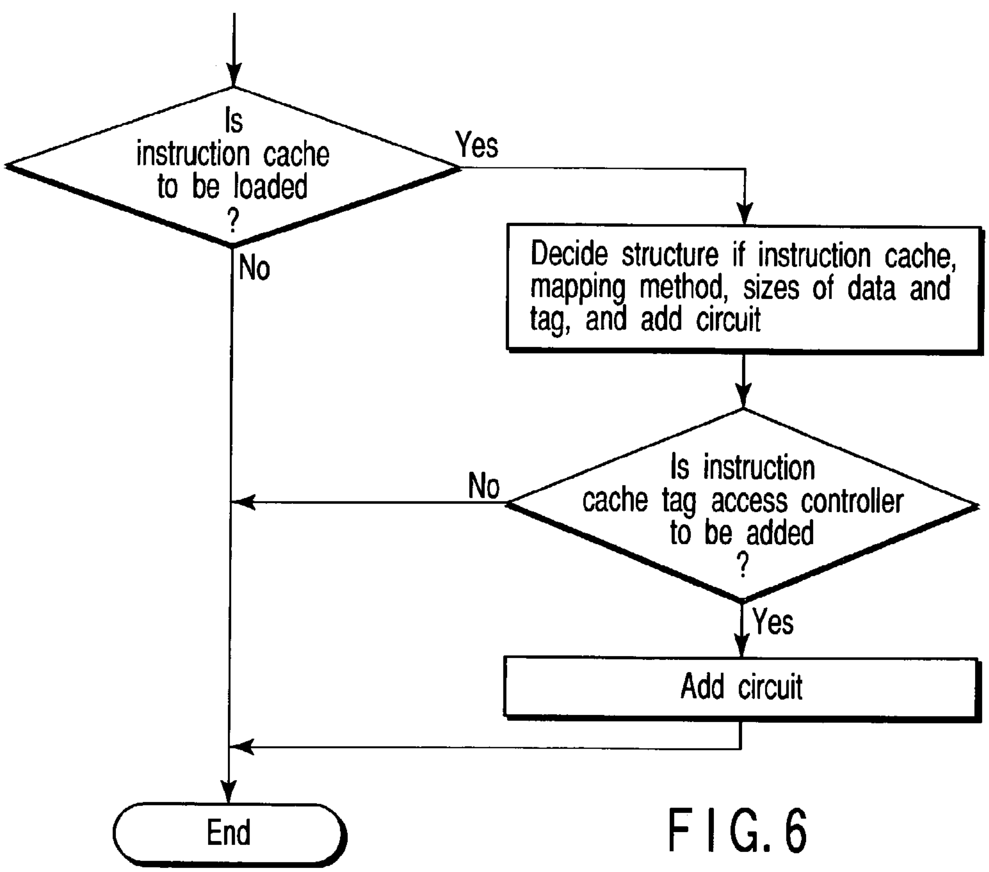
F I G. 6

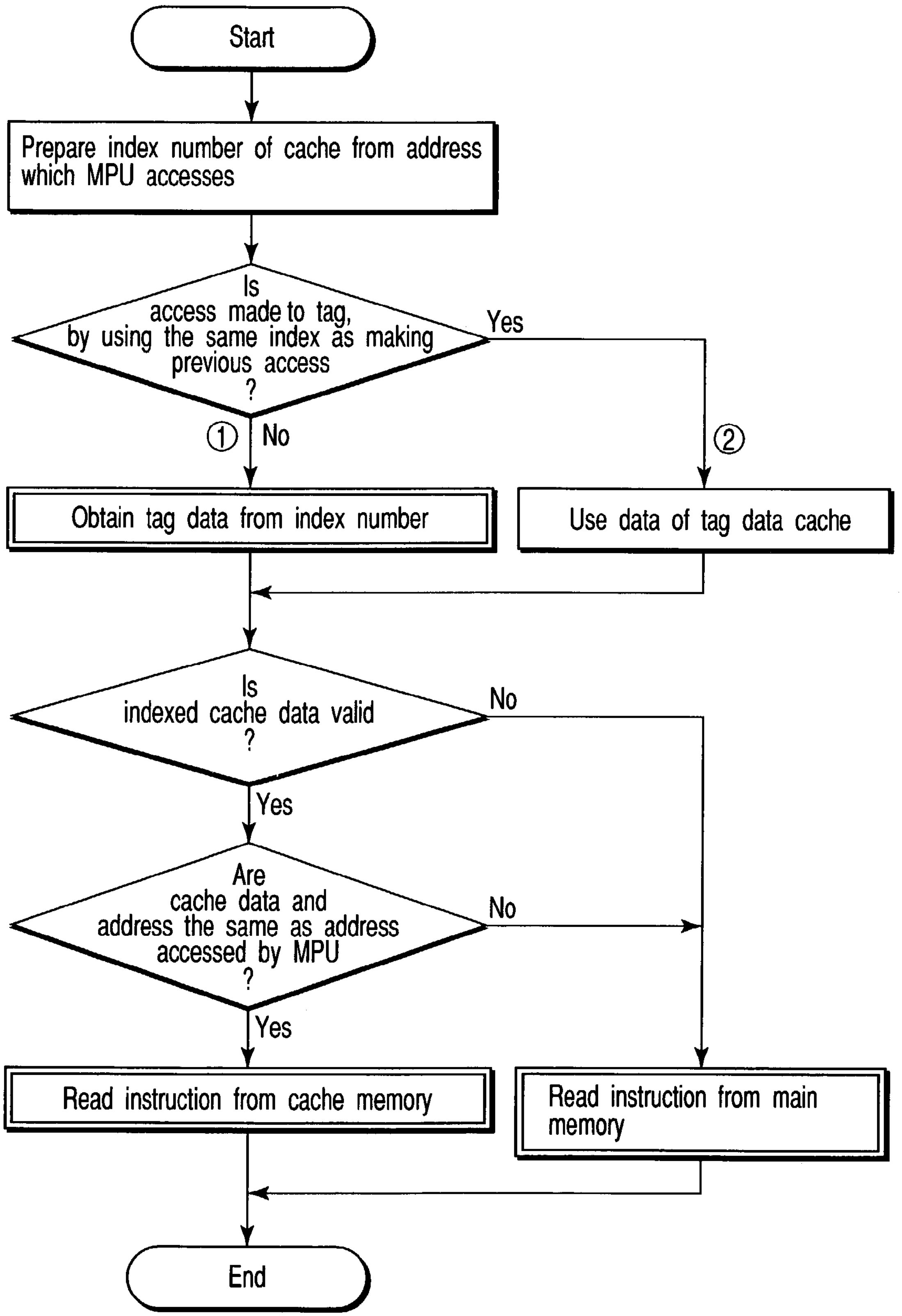
F I G. 5

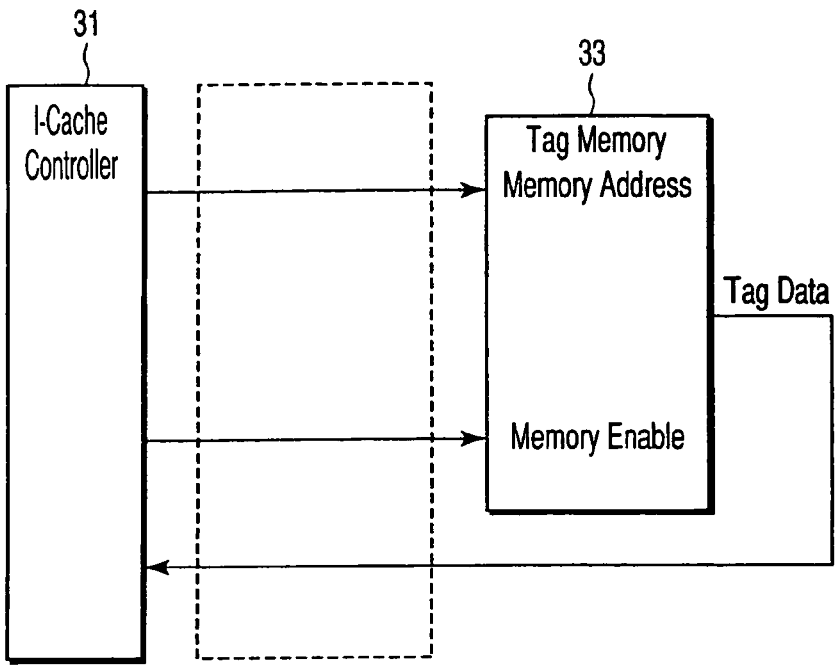
State in which optional tag access controller is removed
F I G. 7A
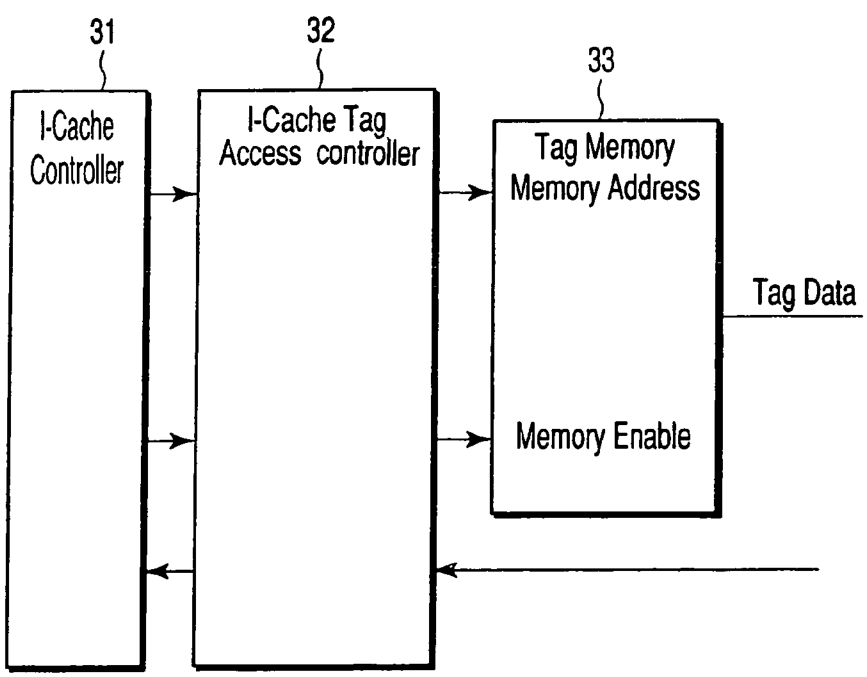
State is which optional tag access controller is added
F I G. 7B

INSTRUCTION CACHE AND MICROPROCESSOR

CROSS-REFERENCE TO RELATED APPLICATIONS

This application is based upon and claims the benefit of priority from the prior Japanese Patent Application No. 2002-257971, filed Sep. 3, 2002, the entire contents of which are incorporated herein by reference.

BACKGROUND OF THE INVENTION

1. Field of the Invention

The present invention relates to an instruction cache and a microprocessor (MPU) in which the instruction cache is provided, and a method of designing the same, and in particular, to a circuit and a method aiming to reduce electric power consumption of an MPU. The present invention is applied to, for example, a configurable processor or the like.

2. Description of the Related Art

In recent years, for example, an instruction cache which is a small capacity but high speed storage device is provided in a general 32-bit MPU in order to reduce the memory access latency for a low speed main memory. In such an MPU, there are many cases based on a procedure in which, at the time of executing an instruction in the main memory at high speed, the instruction read from the main memory in advance is temporarily stored in an instruction cache (on-chip instruction cache), and at the time of reading the same instruction again, the instruction temporarily stored in the instruction cache, and not in the main memory, is used.

FIG. 2 shows a state in which instruction codes on an external main memory are stored in the instruction cache provided in the MPU.

With regard to the data stored in the instruction cache, an instruction code (cache data) and the position of the cache data (Cache Data) on the main memory and a flag showing the validity/invalidity are made to be one set, with an address (Addr) generated from the position of the instruction code on the main memory serving as an index (Index). Here, due to restrictions on the capacity of the instruction cache and in order to efficiently utilize the capacity, one tag and a fixed amount of continuous regions on the main memory correspond to one index.

FIG. 8 shows an example of a conventional instruction cache provided in an MPU.

The instruction cache has an instruction cache controller 81, an instruction cache data memory 82, an instruction cache tag memory 83, and a hit/miss determining circuit (comparator) 84.

In the instruction cache, some of bit signals of access addresses supplied via the instruction cache controller 81 from a fetching counter (not shown) provided in the MPU are inputted to the instruction cache data memory 82, the instruction cache tag memory 83, and the hit/miss determining circuit 84, respectively.

As shown in FIG. 2, the aforementioned cache data memory 82 is configured to have a plurality of cache lines for storing a plurality of words (in this example, 1 word is 32 bits and shows the unit of one instruction) having successive access addresses. Further, readout data are outputted in accordance with access addresses inputted from the MPU.

The instruction cache tag memory 83 stores data required for specifying words stored in the respective cache lines, for each cache line of the instruction cache data memory 82.

Further, when a memory enable (MEMORY Enable) signal inputted from the instruction cache controller 81 by a data readout request from the MPU becomes active, the data is read in accordance with the inputted access address.

The aforementioned hit/miss determining circuit 84 compares an address input read from the instruction cache tag memory 83 and the access address inputted from the MPU, and determines whether they match/do not match (determines whether or not the aforementioned word having the access address is stored in the instruction cache data memory 82) to generate the results of determination as a hit/miss determining signal. In parallel with the operation of the hit/miss determining circuit 84, cache data (an instruction) is read from the instruction cache data memory 82, and outputted to the instruction cache controller 81.

The instruction cache controller 81 decides whether or not the cache data read from the instruction cache data memory 82 is to be fetched into an instruction fetching register of the MPU, in accordance with the hit/miss determining signal from the hit/miss determining circuit 84.

As described above, the instruction cache outputs to the MPU the readout data of 32 bits as an instruction and the hit/miss determining signal of 1 bit expressing whether or not the instruction cache has hit.

In the case of a hit, the MPU fetches the data from the instruction cache data memory 82, and in the case of a miss, the MPU does not fetch the data from the instruction cache data memory 82.

In the case of a miss, an access address is outputted from the instruction cache to the main memory (not shown), and the 32-bit data as the instruction is read from the main memory and outputted to the instruction cache.

FIG. 9 shows an operation flow when the MPU obtains an instruction code from the conventional instruction cache shown in FIG. 8.

At the time of reading the instruction cache at the MPU, when read process of the instruction cache is started by a data readout request, an index number of the instruction cache is prepared from the address stored in the instruction cache which the MPU reads out. Then, corresponding data is obtained from the index number.

Next, it is determined whether or not the indexed cache data is valid. As a result, if it is determined that the indexed cache data is not valid (N), the routine proceeds to a process for reading out an instruction from the main memory, and the readout process of the instruction cache ends (END).

On the other hand, if the cache data is valid (Y), it is determined whether or not the cache data and the address to be read out from the instruction cache are the same. As a result, if they are determined to be the same (Y), the routine proceeds to a process for reading out the instruction from the instruction cache, and the readout process of the instruction cache ends (END). On the contrary, when it is determined that they are not the same (N), the routine proceeds to a process for reading out the instruction from the main memory, and the readout process of the instruction cache ends (END).

The process from Start to End shown in FIG. 9 is repeated for each time the MPU executes one instruction. The block portions enclosed by double lines in the operation flow (process of obtaining tag data from the index number, process of reading the instruction out from the cache memory, and process of reading the instruction out from the main memory) are operations in which a large quantity of electric power is consumed.

By the way, many of the execution instructions of the MPU are non-branch instructions. Here, a branch instruction is a generic expression for instructions which are such that the count value of the fetch counter in the processor 14 jumps, such as jump instructions, subroutine calling instructions, interruption instructions, or the like.

When the MPU executes a non-branch instruction, the instruction cache tag memory is repeatedly read out at the same index, since the instruction codes stored in the main memory are executed in order.

For example, in the example of the instruction codes shown in FIG. 2, at the time of continuously executing the instructions from Code 00 to Code 11, the index at the time of reading out the tag memory is BBBBCCCCDDDD. At this time, even when accessing is carried out at the same index, the same operation is repeated, and the repeated operations have been a cause of an increase in electric power consumption.

As described above, in a conventional MPU, when non-branch instructions which account for the majority of execution instructions are executed, regardless of the fact that the address of the tag memory which is read out prior to reading of the instruction cache is the same, because reading of the tag memory is carried out each time the instruction cache is read, there is the problem that electric power is consumed unnecessarily.

In order to suppress an increase in the electric power consumption of the instruction cache, it has been proposed that operation of the tag memory of the instruction cache be controlled by using a branch instruction detecting signal generated when a branch instruction is detected at the MPU, in "Instruction Cache Memory" of Jpn. Pat. Appln. KOKAI Publication No. 2000-200217.

BRIEF SUMMARY OF THE INVENTION

According to an aspect of the present invention, there is provided an instruction cache comprising an instruction cache control circuit; an instruction cache tag memory; an instruction cache data memory; and an instruction cache tag access control circuit which is provided between the instruction cache control circuit and the instruction cache tag memory, which monitors whether or not an instruction cache tag memory address in an accesses from the instruction cache control circuit to the instruction cache tag memory is the same as that in a previous access from the instruction cache control circuit to the instruction cache tag memory, without being supplied with a non-jump instruction detecting signal from the instruction cache control circuit, and which controls whether or not access to the instruction cache tag memory is possible in accordance with a result of the monitor.

According to another aspect of the present invention, there is provided a microprocessor in which an instruction cache is provided on the same semiconductor chip as a microprocessor circuit, in which the instruction cache comprising an instruction cache control circuit; an instruction cache tag memory; an instruction cache data memory; and an instruction cache tag access control circuit which is provided between the instruction cache control circuit and the instruction cache tag memory, which monitors whether or not an instruction cache tag memory address in an accesses from the instruction cache control circuit to the instruction cache tag memory is the same as that in a previous access from the instruction cache control circuit to the instruction cache tag memory, without being supplied with a non-jump instruction detecting signal from the instruction cache control circuit, and which controls whether or not access to the instruction cache tag memory is possible in accordance with a result of the monitor.

According to a further aspect of the present invention, there is provided a method of designing a microprocessor, comprising arranging an instruction cache control circuit and an instruction cache tag memory and directly connecting the instruction cache control circuit and the instruction cache tag memory by wiring, in a case where an instruction cache is designed to be provided on the microprocessor, in a case where miniaturization of a chip size is given priority over low electric power consumption, and arranging an instruction cache tag access control circuit between the instruction cache control circuit and the instruction cache tag memory, connecting the instruction cache control circuit and the instruction cache tag access control circuit by wiring, and connecting the instruction cache tag access control circuit and the instruction cache tag memory by wiring, in a case where low electric power consumption is given priority over miniaturization of a chip size.

BRIEF DESCRIPTION OF THE DRAWINGS

FIG. 4 is a flowchart showing an operation flow of an instruction cache tag access controller in an access operation to the instruction cache tag memory of FIG. 3.

FIG. 5 is a flowchart showing an operation flow when an instruction code is obtained from the instruction cache at the time of reading an instruction cache in the MPU of FIG. 1.

FIG. 6 is a flowchart showing a case in which an example of a method of designing the MPU of the present invention is applied at the time of designing a configurable processor.

FIG. 7A is a block diagram of a configurable processor designed by the method shown in FIG. 6, in which an instruction cache tag access controller is not added between an existing instruction cache controller and instruction cache tag memory on an MPU chip.

FIG. 7B is a block diagram of a configurable processor designed by the method shown in FIG. 6, in which an instruction cache tag access controller is added between an existing instruction cache controller and instruction cache tag memory on an MPU chip.

DETAILED DESCRIPTION OF THE INVENTION

Hereinafter, embodiments of the present invention will be described in detail with reference to the drawings.

<First Embodiment>

Figure 1:
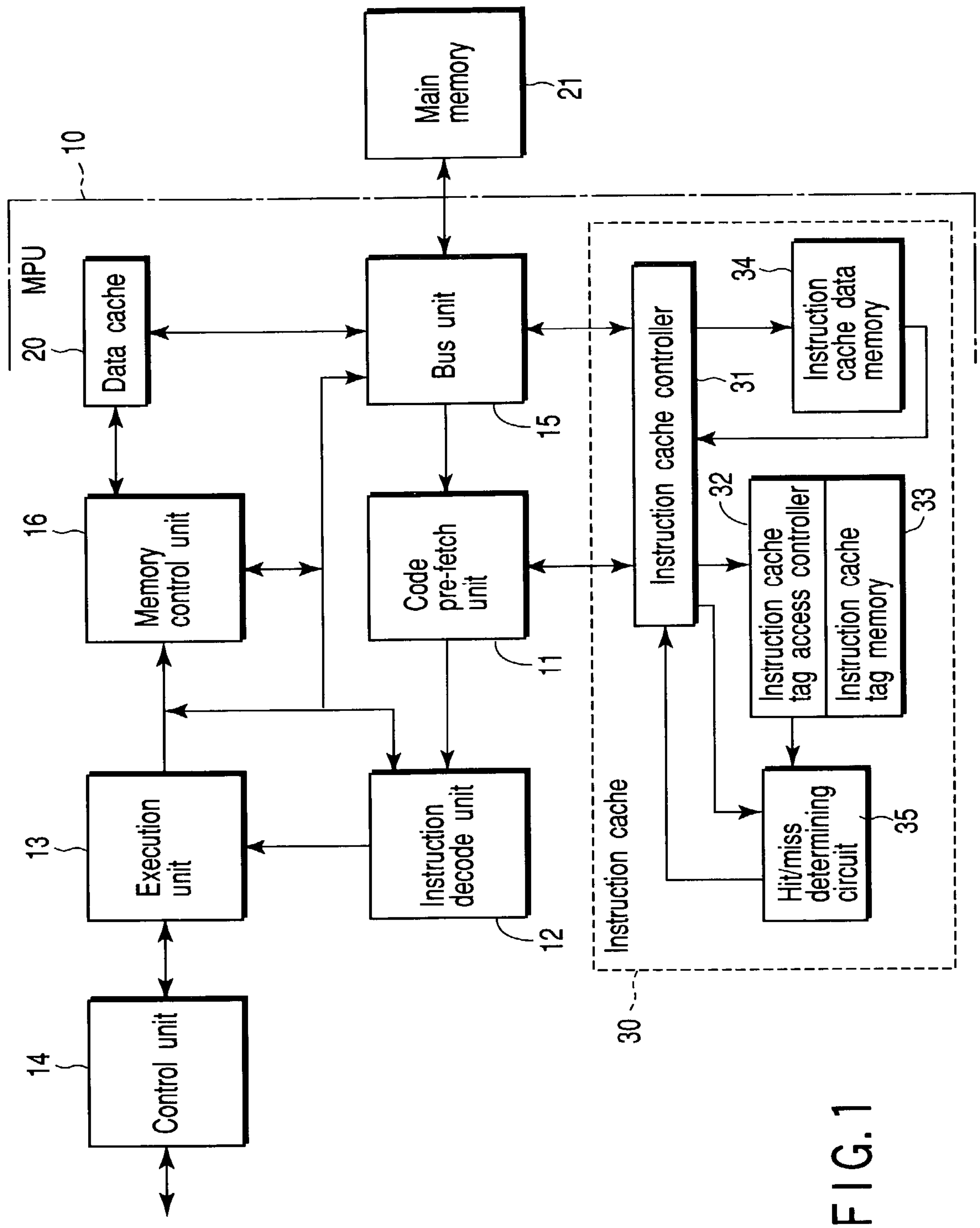
FIG. 1 is a diagram schematically showing a connection relationship between an MPU, in which an instruction cache according to a first embodiment of the present invention is provided, and an external main memory.

FIG. 1 is a diagram schematically showing the relationship of connection between an MPU 10, at which an instruction cache according to a first embodiment of the present invention is provided, and an external main memory 21.

In the MPU 10, an MPU circuit, a data cache 20 and an instruction cache 30 are provided on a semiconductor chip.

The MPU circuit comprises a code pre-fetch unit 11, an instruction decode unit 12, an execution unit 13, a control unit 14, a bus unit 15, and a memory control unit 16. The code pre-fetch unit 11 includes an instruction fetch register or the like. The instruction decode unit 12 decodes instruction codes from the code pre-fetch unit 11 and generates various types of control signals. The execution unit 13 is controlled by the control signals from the instruction decode unit 12 and includes an arithmetic logic circuit (ALU) for carrying out various types of arithmetic/logical operation processes. The control unit 14 functions as an interface between the execution unit 13 and an exterior circuit. The bus unit 15 functions as an interface between the circuits on the semiconductor chip and an external bus. The memory control unit 16 provides and receives data to and from the execution unit 13 and the bus unit 15. The data cache 20 is controlled by the memory control unit 16.

The instruction cache 30 comprises an instruction cache control circuit (instruction cache controller) 31, an instruction cache tag access control circuit (an instruction cache tag access controller) 32, an instruction cache tag memory 33, an instruction cache data memory 34, a hit/miss determining circuit 35, and the like. SRAMs are usually used as the instruction cache tag memory 33 and instruction cache data memory 34.

A part of the bit signals of the access address supplied from a fetching counter (not shown) provided in the MPU are inputted, via the instruction cache controller 31, to the instruction cache tag access controller 32. Also, another part of the bit signals of the access address from the fetching counter are inputted, via the instruction cache controller 31, to the instruction cache tag memory 33. Similarly, a further part of the bit signals of the access address supplied from the fetching counter are inputted, via the instruction cache controller 31, to the instruction cache data memory 34. Moreover, a further part of bit signals of the access address supplied from the fetching counter are inputted, via the instruction cache controller 31, to the hit/miss determining circuit 35.

Figure 2:
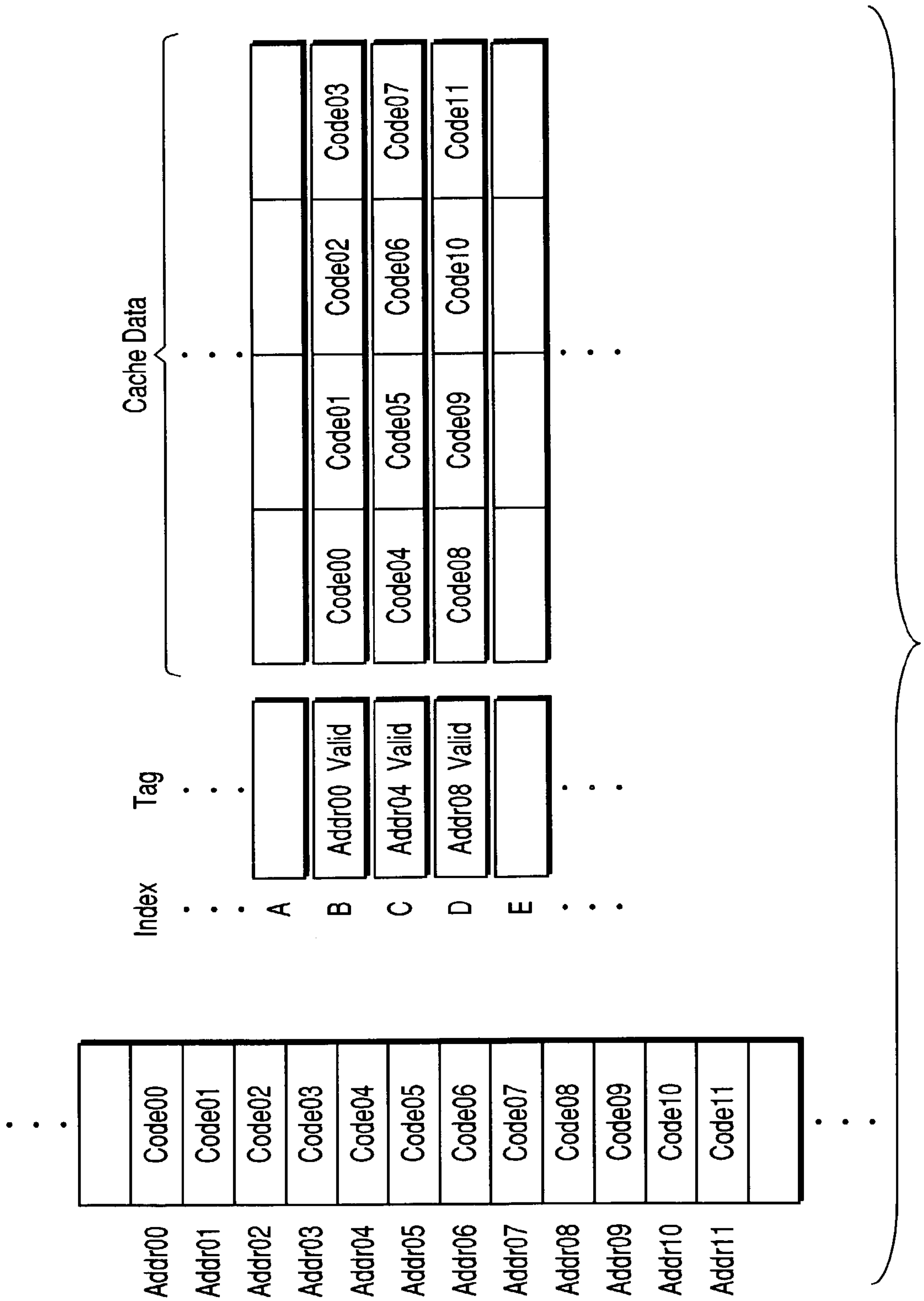
FIG. 2 is a diagram showing a state in which instruction codes on the external main memory are stored in the instruction cache provided in the MPU of FIG. 1.

FIG. 2 shows an example of a state in which instruction codes on the external main memory 21 are stored in the instruction cache 30 provided in the MPU 10 of FIG. 1.

As data stored in the instruction cache, an instruction code (cache data) and the position of the cache data on the main memory and a flag showing validity/invalidity of the cache data are made to be a set, with an address generated from the position of the instruction code on the main memory serving as an index. Here, due to restrictions on the capacity of the instruction cache and in order to efficiently utilize the capacity, one tag and an amount of continuous regions on the main memory correspond to one index.

With regard to the data stored in the instruction cache 30 in FIG. 1, as shown in FIG. 2, the instruction code (cache data) and the positions of the cache data on the main memory 21 and flags showing validity/invalidity are made to be sets, with addresses generated from the positions of the instruction codes on the main memory 21 serving as indexes.

Figure 3:
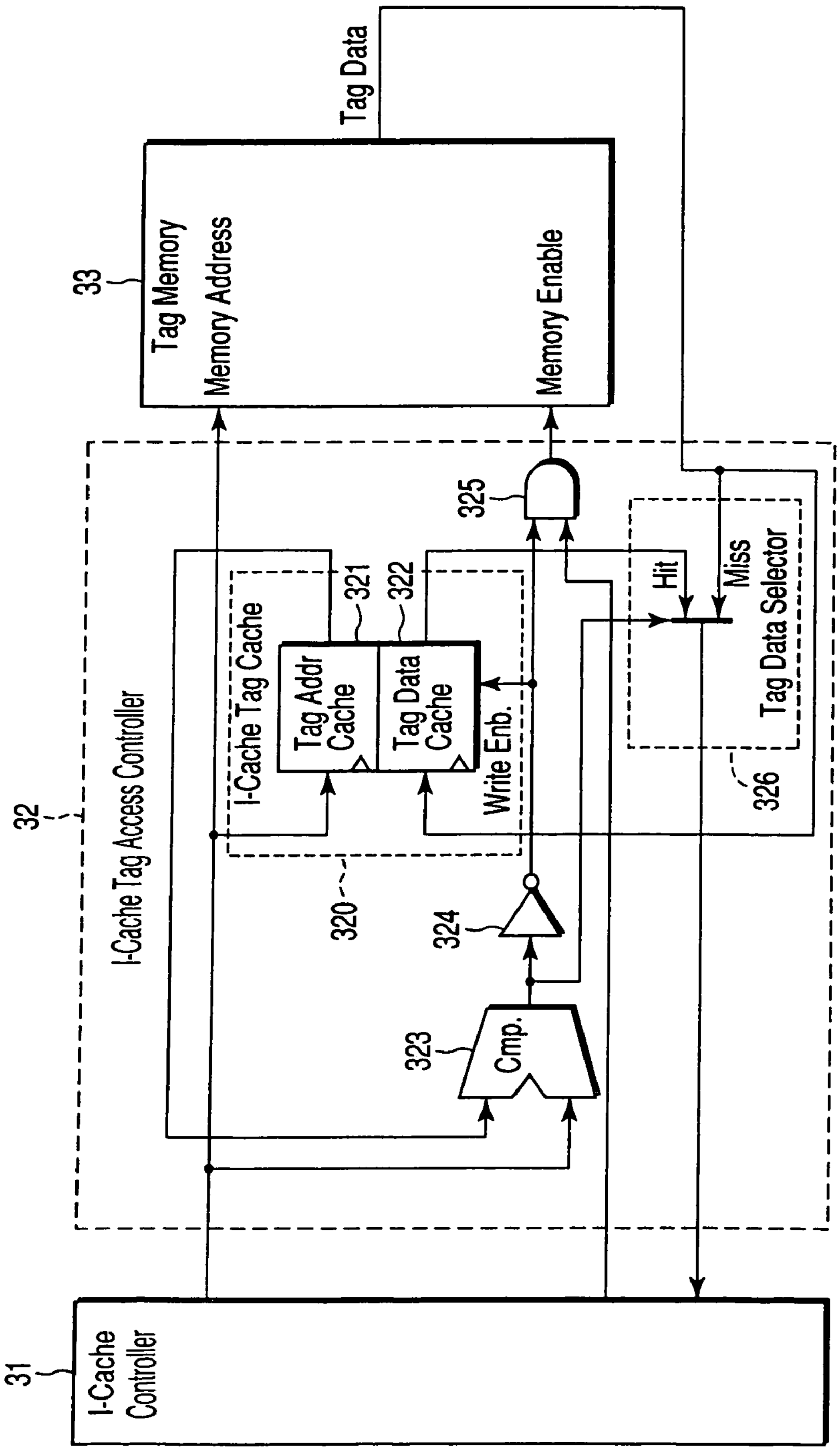
FIG. 3 is a circuit diagram showing a part of the instruction cache in FIG. 1.
Figure 8:
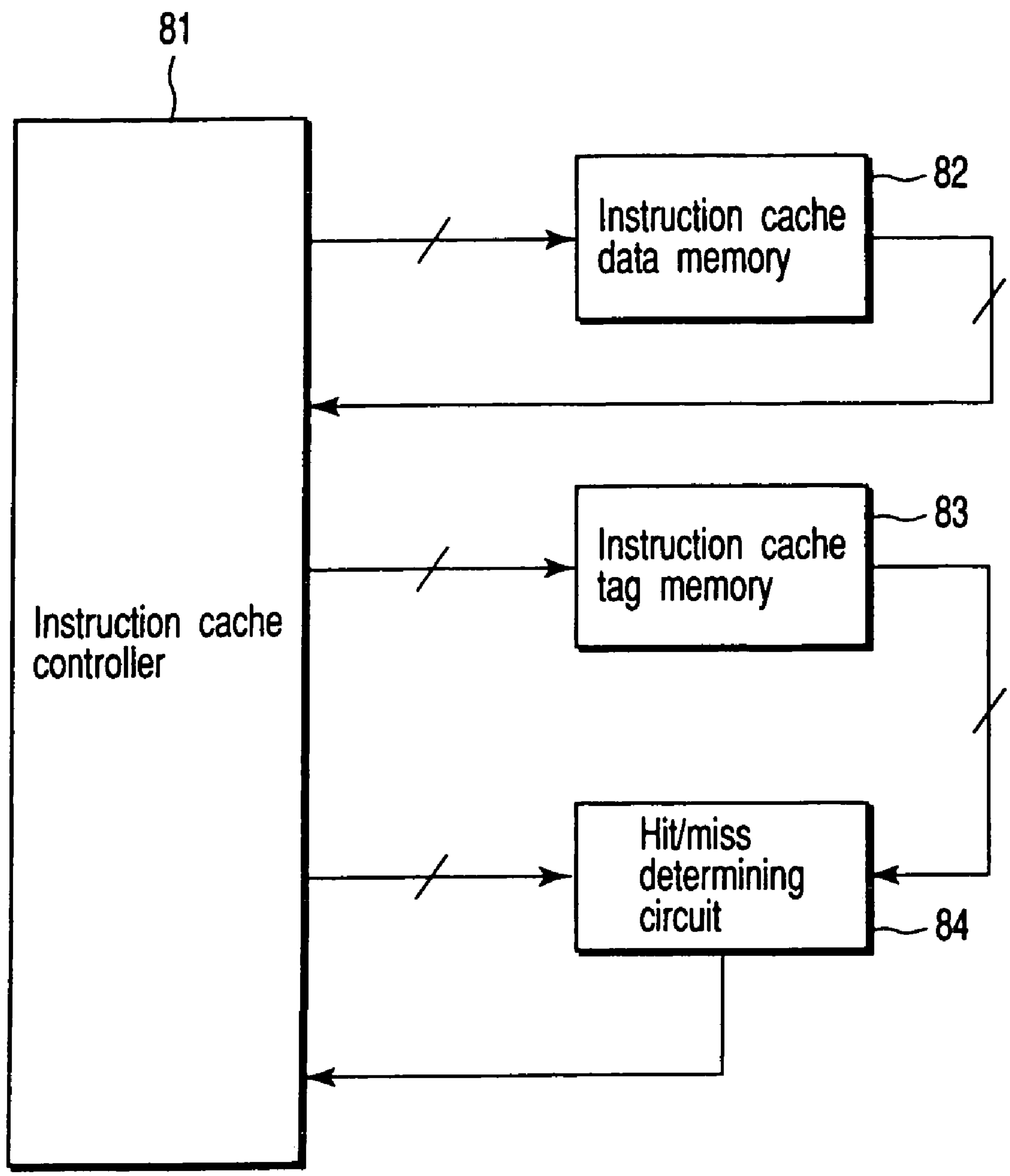
FIG. 8 is a block diagram showing an example of an instruction cache provided in a conventional MPU.
Figure 9:
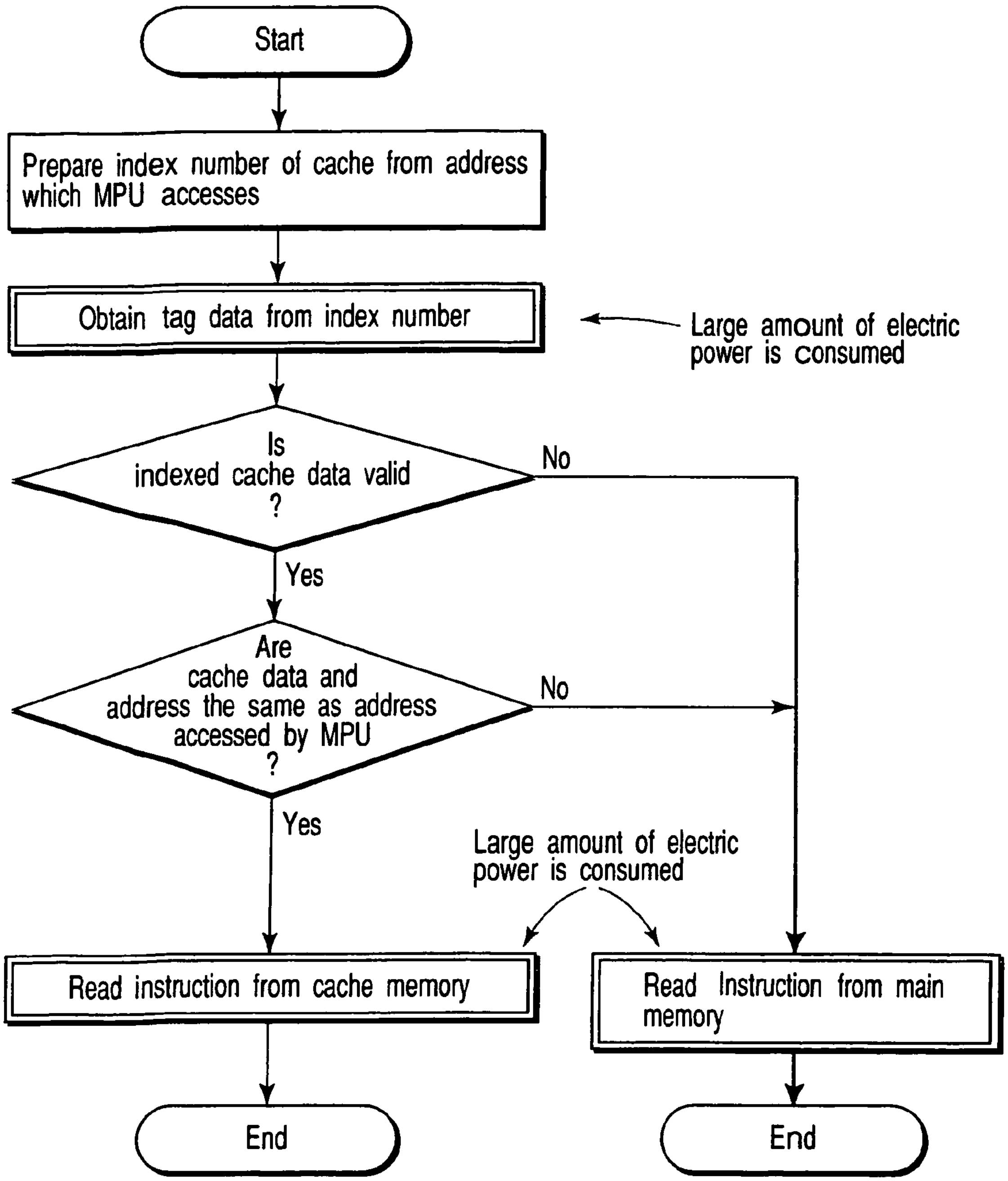
FIG. 9 is a flowchart showing an operation flow when the conventional MPU obtains an execution instruction from the instruction cache.

FIG. 3 shows in detail a part of the instruction cache 30 in FIG. 1.

The instruction cache 30 of the present embodiment is structured so as to carry out caching also for the instruction cache tag memory (Tag Memory) 33. The instruction cache tag access controller (I-Cache Tag Access Controller) 32 is inserted and added between the instruction cache controller (I-Cache Controller) 31 and the instruction cache tag memory 33 for a conventional cache memory.

In this case, the instruction cache control circuit 31 is an existing instruction cache control circuit, the instruction cache tag memory 33 is an existing instruction cache tag memory, and the instruction cache tag access control circuit 32 emulates an interface and protocol between the instruction cache control circuit and the instruction cache tag memory, without requiring a change in the interface between the instruction cache control circuit and the instruction cache tag memory.

An example of the instruction cache tag access controller 32 comprises a tag address cache (Tag Addr. Cache) 321, a tag data cache (Tag Data Cache) 322, a comparator (Cmp.) 323, and an instruction cache tag memory access control section. The tag address cache 321 holds an instruction cache tag memory address at the time of reading with respect to the instruction cache 30. The tad data cache 322 holds readout data from the instruction cache tag memory 33 designated by the instruction cache tag memory address at the time of reading. The comparator 323 compares the instruction cache tag memory address held in the tag address cache 321 and the instruction cache tag memory address at the time of newly reading with respect to the instruction cache 30, and detects that the addresses match/do not match with each other.

The instruction cache tag memory access control section is configured so as to control access to the instruction cache tag memory 33 on the basis of the detected output of the comparator 323. That is, on the basis of a matching output of the comparator 323, an access to the instruction cache tag memory 33 is omitted, and the data held in the tag data cache 322 (the contents of the instruction cache tag memory 33 designated by the instruction cache tag memory address at the time of the previous reading with respect to the instruction cache 30) is outputted to the instruction cache controller 31.

On the contrary, on the basis of a not-matching output from the comparator 323, access to the instruction cache tag memory 33 is carried out, the contents of the instruction cache tag memory 33 are read and outputted to the instruction cache controller 31.

Next, a concrete example of the instruction cache tag memory access controller 32 will be described.

The instruction cache tag memory access controller 32 has a tag cache 320 which is a buffer for temporarily storing an address value (some of the bit signals of an access address signal supplied from the fetch counter provided in the MPU) at the time of reading the instruction cache tag memory, and tag data of the address. The instruction cache tag memory access controller 32 further includes the comparator 323 for determining whether or not there is the need to read the instruction cache tag memory 33, an inverter circuit 324, a dual input AND circuit 325, and a tag data selector (Tag Data Selector) 326.

The tag cache 320 is formed of the tag address cache 321 having stored therein the tag address at the time when the MPU last read the instruction cache tag memory 33 in order to obtain an instruction; and a tag data cache 322 having the tag data of the address stored therein. The tag address cache 321 and the tag data cache 322 are each formed of, for example, a plurality of flip-flop circuits.

At the comparator 323, an address value at the time of reading the instruction cache tag memory is inputted to one input terminal, and a tag address read from the tag address cache 321 is inputted to the other input terminal. The comparator 323 compares these two address inputs, and generates an output signal having a logic level determined in accordance with matching (Hit)/non-matching (Miss). The comparator 323 is formed of, for example, a plurality of exclusive OR circuits.

The output signal of the above-described comparator 323 is inputted to one input terminal of the AND circuit 325 via the inverter circuit 324, and a memory enable signal is inputted from the instruction cache controller 31 to the other input terminal of the AND circuit 325. The output signal of the AND circuit 325 is inputted as a control signal (Memory Enable) of the instruction cache tag memory 33. In this case, the output signal of the inverter circuit 324 is inputted as a write enable (Write Enb) signal of the tag data cache 322, and the write enable signal controls whether or not the readout data from the instruction cache tag memory 33 is to be written into the tag data cache 322.

The tag data selector 326 selects the readout data from the tag data cache 322 and the readout data from the instruction cache tag memory 33 in accordance with the output signal (hit/miss determining signal) of the comparator 323, and outputs the selected data to the instruction cache controller 31.

FIG. 4 shows an operation flow of the instruction cache tag access controller 32 in the access operation with respect to the instruction cache tag memory of FIG. 3.

FIG. 5 shows an operation flow performed when an execution instruction is obtained from the instruction cache at the time of reading the instruction cache at the MPU of FIG. 1, and includes a part of the operation flow of FIG. 4.

Next, operation of the time of reading the instruction cache at the MPU of FIG. 1 will be described with reference to FIG. 3 through FIG. 5.

At the time of reading the instruction cache at the MPU, reading of the tag data of the designated address from the instruction cache tag memory 33 is started by a data readout request.

At this time, an address value supplied to the instruction cache tag memory 33 and the tag address read from the tag address cache 321 are compared by the comparator 323. At this time, if a match is detected, the data of the tag data cache 322 can be used, and it is determined that there is no need to read from the instruction cache tag memory 33, and a hit distinguishing signal which is "H" level is outputted. On the other hand, if non-matching is detected, because the data of the tag data cache 322 cannot be used, it is determined there is the need to read from the instruction cache tag memory 33, and a miss distinguishing signal which is "L" level is outputted.

When the hit distinguishing signal which is "H" level is outputted, the output signal of the inverter circuit 325 becomes "L" level, and a state arises in which rewriting into the tag data cache 322 is prohibited. Moreover, the output signal of the AND circuit 325 becomes "L" level, and reading from the instruction cache tag memory 33 is prohibited.

When the miss distinguishing signal which is "L" level is outputted, the output signal of the inverter circuit 325 becomes "H" level, and a state arise in which rewriting into the tag data cache 322 is allowed. Moreover, the output signal of the AND circuit 325 becomes "H" level within a period when the memory enable signal inputted from the instruction cache controller 31 is active, and reading from the instruction cache tag memory 33 is carried out.

Further, in accordance with the results of the comparator 323, the data from the tag data cache 322 or the data from the instruction cache tag memory 33 is selected by the tag data selector 326 and outputted.

Moreover, as described above, the tag address outputted from the instruction cache tag memory access controller 32 and the address for reading out the instruction cache tag memory supplied from the fetch counter (not shown) provided in the MPU are compared by the hit/miss determining circuit 35 for generating a cache control signal. The hit/miss determining circuit 35 compares these two address inputs, and generates a hit/miss distinguishing signal as a cache control signals in accordance with the matching/non-matching. In parallel with the operation of the hit/miss determining circuit 35, cache data (an instruction) is read out from the cache data memory 34, and outputted to the instruction cache controller 31.

The instruction cache controller 31 decides whether or not the cache data read out from the cache data memory 34 is to be fetched into the instruction fetching register, in accordance with whether the hit/miss distinguishing signal of the hit/miss determining circuit 35 for generating a control signal is a hit or a miss. Namely, if it is a hit, the data from the cache data memory 34 is fetched, and if it is a miss, the data from the cache data memory 34 is not fetched. In the case of a miss, the memory access controller accesses the main memory 21.

In other words, in the above-described embodiment, the instruction cache tag access controller 32 incorporates the tag cache 320 which is a buffer for temporarily storing an address value at the time of reading out the tag memory, and the tag data of that address. The tag cache 320 is formed of the tag address cache 321 in which the tag address at the time of reading out the tag memory finally stored, and the tag data cache 322 in which the tag data of the address is stored.

The comparator 323 which compares the tag addresses at the time of reading the instruction cache is connected to the output side of the above-described tag address cache 321 in order to carry out determination as to whether or not there is the need to read the tag memory. At the comparator 323, if a match is not detected, it is determined that the data of the tag cache cannot be used, and reading operation of the tag memory 33 is carried out. If a match is detected, the data of the tag cache can be used, and it is determined that there is no need to read from the tag memory 33.

Further, in accordance with the results of the above-described comparator 323, the data from the tag memory 33 or the data from the tag cache 320 is selected.

Next, effects in accordance with the above-described embodiment will be described.

When the MPU requests an instruction with respect to the instruction cache, the instruction cache controller 31 refers to the instruction cache tag memory 33, and accesses the instruction cache 30 or the external memory (main memory 21) in accordance with the contents. In this sequence, the instruction cache tag memory 33 is accessed for each instruction. However, since instructions are executed in the order of the addresses in non-jump instructions which account for the majority of the instructions of the MPU, there are many cases in which accessing to the instruction cache tag memory 33 of the MPU is carried out for the same address.

At this time, at the time of reading the instruction cache tag memory 33 which is carried out prior to reading of the instruction cache 30 from the MPU, if the instruction cache tag memory address is the same as the address at the time of reading the instruction cache tag memory 33 at the previous time, the instruction cache tag access controller 32 selects the data of the tag cache 320 instead of the data of the instruction cache tag memory 33.

Namely, in the flow for acquiring the tag data from the index number described above with reference to FIG. 2, as described in the flows of FIG. 4 and FIG. 5, route ① is used immediately after the index changes, but route ② is used during the time when the same index is used. Therefore, it is possible to omit the instruction cache tag memory access which consumes a large amount of electric power.

Accordingly, in accordance with the embodiment, in the flow described above with reference to FIG. 5, the number of times of access to the instruction cache tag memory 33, which consumes a large amount of electric power, is reduced, and low electric power consumption of the MPU can be attained.

As shown in FIG. 2, one cache line size corresponding to one index stored in the instruction cache 30 is usually determined by the capacity of the instruction cache or the hit ratio. However, in the present invention, the larger the one cache line size, the more effective.

Further, the aforementioned instruction cache tag access controller 32 has built therein a circuit for determining whether or not there is the need to access the instruction cache tag memory 33 (whether it is possible for access to be omitted). In this case, the instruction cache control circuit 31 is an existing instruction cache control circuit, the instruction cache tag memory 33 is an existing instruction cache tag memory, and the instruction cache tag access control circuit 32 emulates an interface and protocol between the instruction cache control circuit and the instruction cache tag memory, without requiring a change in the interface between the instruction cache control circuit and the instruction cache tag memory.

Accordingly, in the instruction cache tag access controller 32 according to the present invention, it is not unnecessary to add a special circuit to the existing instruction cache controller 31 or instruction cache tag memory 33. It is easily possible to selectively add the instruction cache tag access controller 32 to an existing circuit or delete the instruction cache tag access controller 32 from the exiting circuit, and it is possible to flexibly correspond to the design.

This means that the present invention can be applied to a configurable processor (Configurable Processor) proposed as one of the new method of designing an MPU, and that low electric power consumption of an on-chip instruction cache is selectively possible.

The configurable processor is a technique in which a function which can be a structure element of the MPU is registered in a library of automatic arrangement wiring design tools as IP (intellectual property), and a desired configuration is realized by combining desired IPs in accordance with specifications of users or intentions of designers of manufacturers.

FIG. 6 is a flowchart showing a case in which one example of the method of designing an MPU of the present invention is applied at the time of designing a configurable processor. FIG. 7A is a block diagram of a configurable processor designed by the method shown in FIG. 6, in which an instruction cache tag access controller is not added between an existing instruction cache controller and instruction cache tag memory on an MPU chip, and FIG. 7B is a block diagram of a configurable processor designed by the method shown in FIG. 6, in which an instruction cache tag access controller is added between an existing instruction cache controller and instruction cache tag memory on an MPU chip.

FIGS. 7A and 7B show that the instruction cache tag access controller 32 can be selectively added between the existing instruction cache controller 31 and the instruction cache tag memory 33 on the MPU chip by the designing method of FIG. 6.

As shown in FIG. 6, at the time of designing a configurable processor, it is determined whether or not the instruction cache is to be provided in the MPU. When the instruction cache is to be provided (Y), the structure of the instruction cache, the mapping method (a direct mapping method, a set associative mapping method, a full associative mapping method, or the like), the size of the data and the tag, and the like are decided, and a desired circuit is added.

Next, it is determined whether the instruction cache tag access controller 32 is to be added or not. When the instruction cache tag access controller 32 is not to be added (N), as shown in FIG. 7A, the instruction cache controller 31 and the instruction cache tag memory 33 are designed to be arranged, and the controller 31 and the memory 33 are directly connected to each other by wiring. In this case, miniaturization of the chip size is more possible than in a case in which the instruction cache tag access controller 32 is added.

On the contrary, when the instruction cache tag access controller 32 is to be added (Y), as shown in FIG. 7B, the instruction cache tag access controller 32 is designed to be arranged between the instruction cache controller 31 and the instruction cache tag memory 33, and the instruction cache controller 31 and the instruction cache tag access controller 32 are connected by wiring, and the instruction cache tag access controller 32 and the instruction cache tag memory 33 are connected by wiring. In this case, low electric power consumption is possible as described above.

Note that it is possible to make changes such that the instruction cache controller 31 and instruction cache tag access controller 32 are provided on the same chip as the MPU, and the instruction cache tag memory 33 and the instruction cache data memory 34 are provided at the exterior of the MPU.

As described above, in accordance with the instruction cache and the microprocessor having the instruction cache provided thereon according to the embodiment, without making modifications to a conventional instruction cache controller, the number of times that the instruction cache tag memory is accessed can be reduced, and low electric power consumption can be aimed for, and it is possible to flexibly correspond to the design.

Further, the method of designing the microprocessor of the embodiment selectively enables low electric power consumption of an on-chip instruction cache, and is effective in application to a configurable processor.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An instruction cache comprising:

an instruction cache control circuit;

an instruction cache tag memory;

an instruction cache data memory; and an instruction cache tag access control circuit which is provided between the instruction cache control circuit and the instruction cache tag memory, the instruction cache tag access control circuit configured to monitor whether or not an instruction cache tag memory address in an access from the instruction cache control circuit to the instruction cache tag memory is the same as that in a previous access from the instruction cache control circuit to the instruction cache tag memory, without a non-jump instruction detecting signal being supplied from the instruction cache control circuit to the instruction cache tag access control circuit, to control whether or not access to the instruction cache tag memory is possible based on a status of equivalence of the instruction cache tag memory addresses determined by the monitoring.

2. An instruction cache according to claim 1, wherein the instruction cache control circuit is an conventional instruction cache control circuit, and the instruction cache tag memory is an conventional instruction cache tag memory.

3. An instruction cache according to claim 2, wherein the instruction cache tag access control circuit comprises:

a tag address cache which holds an instruction cache tag memory address at a time of reading the instruction cache;

a tag data cache which holds a readout data from the instruction cache tag memory designated by the instruction cache tag memory address;

a comparator which compares the instruction cache tag memory address at the time of reading the instruction cache and an instruction cache tag memory address at the previous access which is held in the tag address cache, and determines a match or non-match; and an instruction cache tag memory control circuit which controls an access to the instruction cache tag memory on the basis of a detected output of the comparator.

4. An instruction cache according to claim 3, wherein the instruction cache tag memory access control circuit comprises:

a selector which selects data held in the tag memory cache or data held in the instruction cache tag memory, and outputs a selected data to the instruction cache control circuit; and a logic circuit which, on the basis of a match detection output of the comparator, prohibits access to the instruction cache tag memory and controls the selector to select the data held in the tag memory cache, and which, on the basis of a non-match detection output of the comparator, allows the access to the instruction cache tag memory and controls the selector to select data held in the instruction cache tag memory and functions to write data, which is selected by the selector, held in the instruction cache tag memory, into the tag data cache.

5. An instruction cache according to claim 1, wherein the instruction cache tag access control circuit comprises:

a tag address cache which holds an instruction cache tag memory address at a time of reading the instruction cache;

a tag data cache which holds a readout data from the instruction cache tag memory designated by the instruction cache tag memory address;

a comparator which compares the instruction cache tag memory address at the time of reading the instruction cache and an instruction cache tag memory address at the previous access which is held in the tag address cache, and determines a match or non-match; and an instruction cache tag memory control circuit which controls an access to the instruction cache tag memory on the basis of a detected output of the comparator.

6. An instruction cache according to claim 5, wherein the instruction cache tag memory access control circuit comprises:

a selector which selects data held in the tag memory cache or data held in the instruction cache tag memory, and outputs data selected by the selector to the instruction cache control circuit; and a logic circuit which, on the basis of a match detection output of the comparator, prohibits access to the instruction cache tag memory and controls the selector to select the data held in the tag memory cache, and which, on the basis of a non-match detection output of the comparator, allows the access to the instruction cache tag memory and controls the selector to select data held in the instruction cache tag memory and functions to write data, which is selected by the selector, held in the instruction cache tag memory, into the tag data cache.

7. A microprocessor in which an instruction cache is provided on the same semiconductor chip as a microprocessor circuit, in which the instruction cache comprises:

an instruction cache control circuit;

an instruction cache tag memory;

an instruction cache data memory; and an instruction cache tag access control circuit which is provided between the instruction cache control circuit and the instruction cache tag memory, the instruction cache tag access control circuit configured to monitor whether or not an instruction cache tag memory address in an access from the instruction cache control circuit to the instruction cache tag memory is the same as that in a previous access from the instruction cache control circuit to the instruction cache tag memory, without a non-jump instruction detecting signal being supplied from the instruction cache control circuit to the instruction cache tag access control circuit, to control whether or not access to the instruction cache tag memory is possible based on a status of equivalence of the instruction cache tag memory addresses determined by the monitoring.

8. A microprocessor according to claim 7, wherein the instruction cache control circuit is an conventional instruction cache control circuit, and the instruction cache tag memory is an conventional instruction cache tag memory.

9. A microprocessor according to claim 8, wherein the instruction cache tag access control circuit comprises:

a tag address cache which holds an instruction cache tag memory address at a time of reading the instruction cache;

a tag data cache which holds a readout data from the instruction cache tag memory designated by the instruction cache tag memory address;

a comparator which compares the instruction cache tag memory address at the time of reading the instruction cache and an instruction cache tag memory address at the previous access which is held in the tag address cache, and determines a match or non-match; and an instruction cache tag memory control circuit which controls an access to the instruction cache tag memory on the basis of a detected output of the comparator.

10. A microprocessor according to claim 7, wherein the instruction cache tag access control circuit comprises:

a tag address cache which holds an instruction cache tag memory address at a time of reading the instruction cache;

a tag data cache which holds a readout data from the instruction cache tag memory designated by the instruction cache tag memory address;

a comparator which compares the instruction cache tag memory address at the time of reading the instruction cache and an instruction cache tag memory address at the previous access which is held in the tag address cache, and determines a match or non-match; and an instruction cache tag memory control circuit which controls an access to the instruction cache tag memory on the basis of a detected output of the comparator.

* * * * *